United States Patent
Tesis et al.

(10) Patent No.: US 12,375,493 B2
(45) Date of Patent: Jul. 29, 2025

(54) ENFORCING JIT ACCESS CONTROL BY LEVERAGING PAM AND LDAP

(71) Applicant: Salesforce, Inc., San Francisco, CA (US)

(72) Inventors: Yan Tesis, Lafayette, CA (US); Kamran Khan, Bellevue, WA (US)

(73) Assignee: Salesforce, Inc.

( * ) Notice: Subject to any disclaimer, the term of this patent is extended or adjusted under 35 U.S.C. 154(b) by 296 days.

(21) Appl. No.: 18/159,460

(22) Filed: Jan. 25, 2023

(65) Prior Publication Data

US 2024/0250948 A1 Jul. 25, 2024

(51) Int. Cl.
*H04L 9/40* (2022.01)
*H04L 61/4523* (2022.01)

(52) U.S. Cl.
CPC ........ *H04L 63/102* (2013.01); *H04L 61/4523* (2022.05); *H04L 63/105* (2013.01); *H04L 63/108* (2013.01)

(58) Field of Classification Search
None
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |

(Continued)

OTHER PUBLICATIONS

MySQL 5.7 Reference Manual—devdoc.net (https://devdoc.net/database/MySQL-refman-5.7/security.html#privilege-system) (Year: 2017).*

*Primary Examiner* — Boris D Grijalva Lobos
(74) *Attorney, Agent, or Firm* — Lorenz & Kopf, LLP (57) ABSTRACT

Usage of Pluggable Authentication Module (PAM) for time bound access control to any PAM enabled Linux application predicated by rules stored in an LDAP directory including a processor to execute computer-executable instructions for receiving a user information from a user interface indicative of a user, receiving an access request via PAM indicative of the user information, a time of invocation of the access request and the host server, querying a lightweight directory access protocol directory in response to the user information and the request, receiving a plurality of attribute values associated with the user information including a time bound access limit and a host access restriction information, and coupling an access success response to the pluggable access module in response to a host server access allowance indicated by the host access restriction information for the host service and the time of invocation being within the time bound access limit.

20 Claims, 4 Drawing Sheets

(56) References Cited

U.S. PATENT DOCUMENTS

| | | |
|---|---|---|
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,730,478 B2 | 6/2010 | Weissman |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,219,807 B1 * | 7/2012 | Danoyan .............. G06F 21/6281 726/28 |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 9,246,906 B1 * | 1/2016 | Zhou ..................... H04L 63/083 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah |
| 2012/0233137 A1 | 9/2012 | Jakobson et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2016/0014138 A1 * | 1/2016 | Shapiro ................ G06F 16/282 726/4 |
| 2023/0199000 A1 * | 6/2023 | Chen ..................... H04L 63/108 726/9 |

\* cited by examiner

| Attribute Name | Value |
|---|---|
| objectClass | groupOfUniqueNames (structural) |
| objectClass | top (abstract) |
| cn | ExampleJITGroup |
| uniqueMember | 0.9.2342.19200300.100.1.1=admin,2.5.4.11=system |
| uniqueMember | 0.9.2342.19200300.100.1.1=alice,2.5.4.11=system |
| uniqueMember | 0.9.2342.19200300.100.1.1-=bob,2.5.4.11=system |
| jitTriple | (alice,20220721103000-0800, 20220721143000-0800) |
| jitTriple | (bob,20220721124500-0800, 20220721170000-0800) |
| userHostTuple | (alice,hostFQDN1) |
| userHostTuple | (alice,hostFQDN2) |
| userHostTuple | (bob, All) |
|  |  |
|  |  |
|  |  |

ENFORCING JIT ACCESS CONTROL BY LEVERAGING PAM AND LDAP

TECHNICAL FIELD

Embodiments of the subject matter described herein relate generally to just in time access control using pluggable authentication modules. More particularly, embodiments of the subject matter relate to a method and apparatus for leveraging pluggable authentication modules to perform a real-time search in a lightweight directory access protocol (LDAP) to determine whether the user who attempts to access the application has a valid just-in-time access rule at the time of invocation.

BACKGROUND

In information technology (IT) environments, it is desirable to control access to servers and applications such that specific users have access only when they have a valid need or during valid times and time durations. It is desirable to restrict user access to tasks and times relevant to that user's duties, such as access only during business hours, and/or restricted access to data not relevant to their job, such as employee data, accounting data, engineering data, etc.

User access management is employed to perform a number of authentication and authorization tasks, such as user identity verification, password management, determining if a user account is valid, and the like. Existing user access management systems typically employ cache based systems, such as SSSD, and are required to define a caching interval in which rules will be fetched. In this cache based model, system administrators are required to balance a tradeoff between latency, as in at any given time, how long it takes for the local cache on the host to reflect the most current state of the remote directories. A low caching interval will result in lower latency but higher load on the directory while higher interval will result in lower load but higher latency. Cache based systems typically refresh the entire cache at periodic intervals, which may range from every second to once a month, thereby generating a high latency and/or a high load. Accordingly, it is desirable to address these problems and to develop a system and method for providing a low latency, low load access control system. Furthermore, other desirable features and characteristics will become apparent from the subsequent detailed description and the appended claims, taken in conjunction with the accompanying drawings and the foregoing technical field and background.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

The exemplifications set out herein illustrate preferred embodiments of the invention, and such exemplifications are not to be construed as limiting the scope of the invention in any manner.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting but are merely representative. The various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
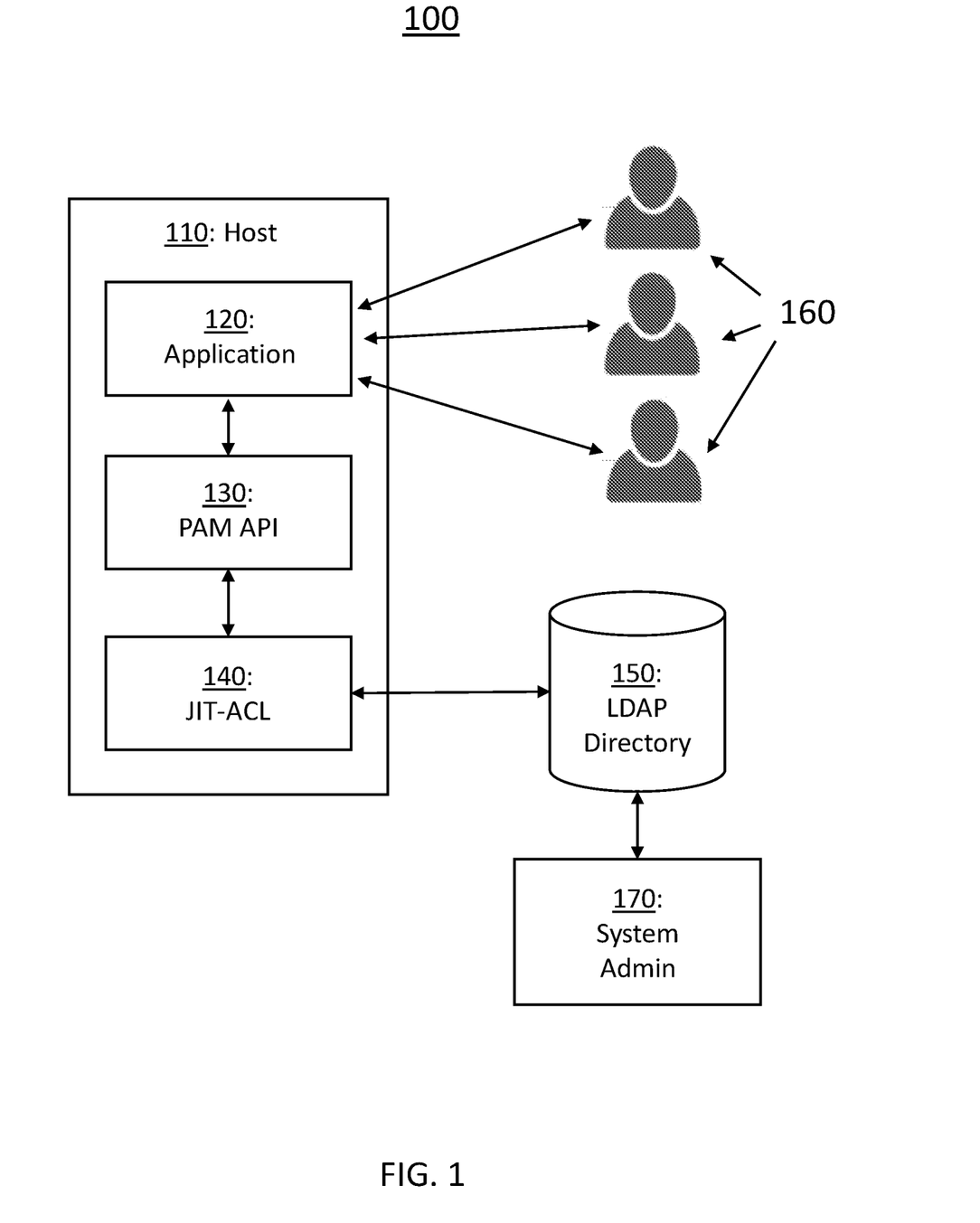
FIG. 1 shows an exemplary environment for just in time access control according to an exemplary embodiment of the present disclosure.

Turning now to FIG. 1, an exemplary environment 100 for just in time (JIT) access control according to an embodiment of the present disclosure is shown. The exemplary environment 100 is illustrative of a plurality of users 160, an application host 110 running an application 120, a pluggable authentication module (PAM) application programming interface (API) 130, and a just in time (JIT) access control layer (ACL) 140. The JIT-ACL 140 and a system administration access 170 are communicatively coupled to an LDAP directory 150. The LDAP directory 150 is an agreed upon protocol, existing access rules database used by many organizations that lists access and authorization rules, such as access times, durations, allowed hosts, functions, and applications for each user or group of users.

The exemplary environment 100 is configured to provide an ephemeral access model where access is provided when it's needed, or JIT access, to provide an additional level of security than a perpetual access model. This JIT access is even more valuable with critical applications such as those used to elevate privileges. For example, attackers that are attempting to move laterally within the network may try to compromise legitimate users credentials. But with JIT, even if they compromised legitimate users credentials, they won't be authorized for access. JIT serves as another layer of authorization. The zero trust model dictates that we should assume that there are attackers that were able to compromise legitimate users credentials. Another desirable use case for JIT access is on a "per need" basis, where users can request access via an external system that can provision access rules dynamically into a directory as opposed to static rules for pre-determined time periods. This external system can, for example, require peer or managerial approval or any other piece of evidence for the need of this access.

The application host 110 may be a Linux host or the like, running one or more applications 120. Examples of applications can include customer relationship management systems, online storefronts, subscription services, media streaming, and internet accessible database applications. In addition, the application host 110 may enable system level applications, such as applications used for host access and privilege elevation, such as SSH for host access and sudo for privilege elevation on Linux based systems. While it's possible and beneficial to leverage this method on the first type of applications, it's even more valuable to do so on the second type, as those applications are used for critical system level access that can affect not just one application but the entire system.

Users 160 request access to the an application and/or a host. The users 160 may have differing levels of access, such as regular application user or privileged access users who can access the system environment. For system and data security reasons, it is desirable to limit access to only verified users who require such access and for only a duration of time required to perform the necessary functions. Having time bound user access data is desired to reduce any security exposure resulting from stale access data and therefore improving the security posture of the system/environment.

Problems with prior just in time access solutions arise in how the host server and access authorization controls handle the impact of directory modifications. For example, if the group membership is cached on the client, the JIT access may still be enabled after the group membership is removed from the server. An advantage of the current JIT-ACL 140 is that the just in time context is stored in the directory, such as when does the access activate and when does it deactivate, and then enforces those rules locally at the host 110. This has the added advantage that the directory information can be distributed to the host 110 in real-time without any concern for that impacting the timing of the session. For example, the JIT-ACL 140 can be used to add and enforce just-in-time access control layer for secure shell deamon (SSHD). Access can be enforced by JIT-ACL (140) by consuming and enforcing the access rules in the LDAP directory 150.

To control access to different applications running on the host 110, the PAM API 130 can include a number of low-level authentication and authorization schemes and integrate them into a high-level API to manage user credentials, passwords and conditions of access, manage authentication mechanisms, enforces Multi-Factor Authentication (MFA) and allows for monitoring privileged user sessions. Leveraging PAM modules for JIT enforcement and by them being modular and pluggable, allows the system administrator the freedom and flexibility to incorporate JIT-ACL into their existing authentication and authorization scheme (for example, any modules that are performing MFA or any existing authorization modules) seamlessly and to determine in which phase of the PAM stack execution they would like to incorporate JIT-ACL (before or after already existing authorization modules that may be in place, as they desire). This allows for the addition of just in time access control layer, with no code and a simple configuration change. All the system administrator will need to do is to add JIT-ACL in the PAM configuration file for the desired application (for example, for sudo, that would usually be in "/etc/pam.d/sudo") in the desired order. When a user will then attempt to access this application, PAM-API 130 will execute the modules in the newly configured order, one of those executions will be (if got to that stage and didn't fail on previous modules) JIT-ACL. Hence achieving the addition of JIT access control layer seamlessly The JIT-ACL 140 can be applied to a PAM 120 enabled application using a LDAP directory 150 as the identity provider for access rules with minimal latency without changing the application's 120 logic or internal implementation. The JIT-ACL 140 configuration achieves a least-privilege access model and enables a shift from a perpetual access model, where users have access all the time, to an ephemeral model where users have access only when they need it, in an environment where the source of authentication for access control rules is the LDAP directory 150.

In some exemplary embodiments, the exemplary system 100 leverages the PAM API 130 to facilitate a real-time search in an LDAP directory 150 to determine whether the user who attempts to access the application has a matching access rule at the time of invocation with matching timestamps to the host (FQDN) the application is being invoked on. The JIT-ACL 140 is initiated by the PAM API 130 and is configured to perform the real time search against the LDAP directory 150 in response to a request from the PAM API 130. The design of the system 100 allows for the access rules in the LDAP directory 150 to be generated statically and/or managed dynamically and change frequently, such as by a system administrator via the system administration access 170. Advantageously, the system administrator does not require access to the application 120 or the host 110 to change the access rules. In some exemplary embodiments, the system administrator 170 may include an external automated system which provisions and de-provisions rules dynamically, such as an external system that requires peer/manager approval, and once that is granted, automatically provisions rules for the user in the directory. This just in time access achieves minimal latency, measured in milliseconds on most systems, for making an access decision. Since these LDAP search queries by the JIT-ACL 140 are made only when needed when the application is being accessed, unnecessary queries and increased system load are avoided. System administrators can leverage LDAP Object Class inheritance to extend their existing LDAP object classes, which represent their currently perpetual access rules, to include those additional attributes and be seamlessly compatible with JIT-ACL 140 with minimal effort. Therefore, the JIT-ACL 140 LDAP interface design enables system administrators to apply a just-in-time layer and enforce time bound access for applications running on their systems without defining new object classes, modifying existing ones and without making significant LDAP schema changes.

Figure 2:
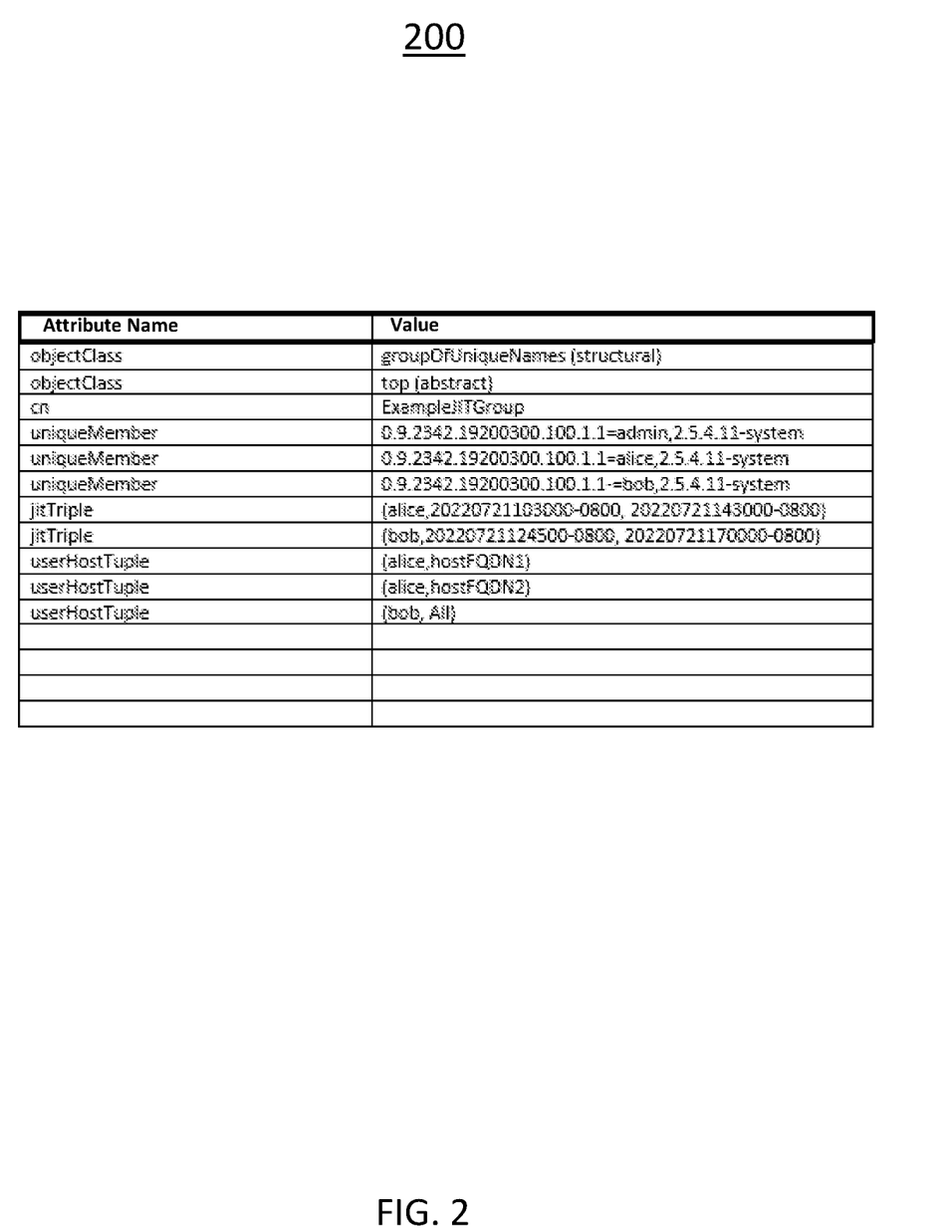
FIG. 2 shows a table illustrative of an exemplary LDAP directory for use by just in time access control according to an exemplary embodiment of the present disclosure.

Turning now to FIG. 2, a table 200 illustrative of an exemplary LDAP record with relevant LDAP attributes that support and express just-in-time access rules for use by just in time access control according to an exemplary embodiment of the present disclosure is shown. An LDAP directory can provide any organized set of records often with a hierarchical structure. The exemplary LDAP record includes names and values for a set of attributes.

In the exemplary LDAP directory, the jitTriple LDAP attribute provides a mechanism for enforcing time-bound access. In addition, the userHostTuple LDAP attribute further provides a way to limit on which hosts (FQDNs) users can access the application. The jitTriple and userHostTuple attributes can be used together to express that certain users have access between two timestamps and only on certain hosts, achieving host level granularity. Multiple userHostTuple attributes can be defined to allow access to as many hosts as needed. userHostTuple can also support the keyword "ALL" for the host part, to express that the user does not have any host limitations.

As shown in the exemplary LDAP directory, alice has Just-In-Time access on Jul. 21, 2022, between 10:30 am PST and 14:30 pm PST and can only access hostFQDN1 and hostFQDN2. Bob has just-in-time access on Jul. 21, 2022, between 12:45 pm PST and 17:00 pm PST, and can access any host during that time as expressed by the (bob,ALL)

value for the userHostTuple attribute. The attribute names jitTriple and userHostTuple can be customized. The JIT-ACL used with any PAM enabled Linux application will enforce the above access rules to the application.

In some exemplary embodiments, the LDAP directory may be dynamically provisioned in response to a request form a user requesting authorization. The user may define a rule to be added, modified or deleted and include this defined rule in the request. This request may be transmitted to a system administrator or peer. If the request is authorized, the LDAP directory is automatically updated with the defined rule and/or rule change.

Figure 3:
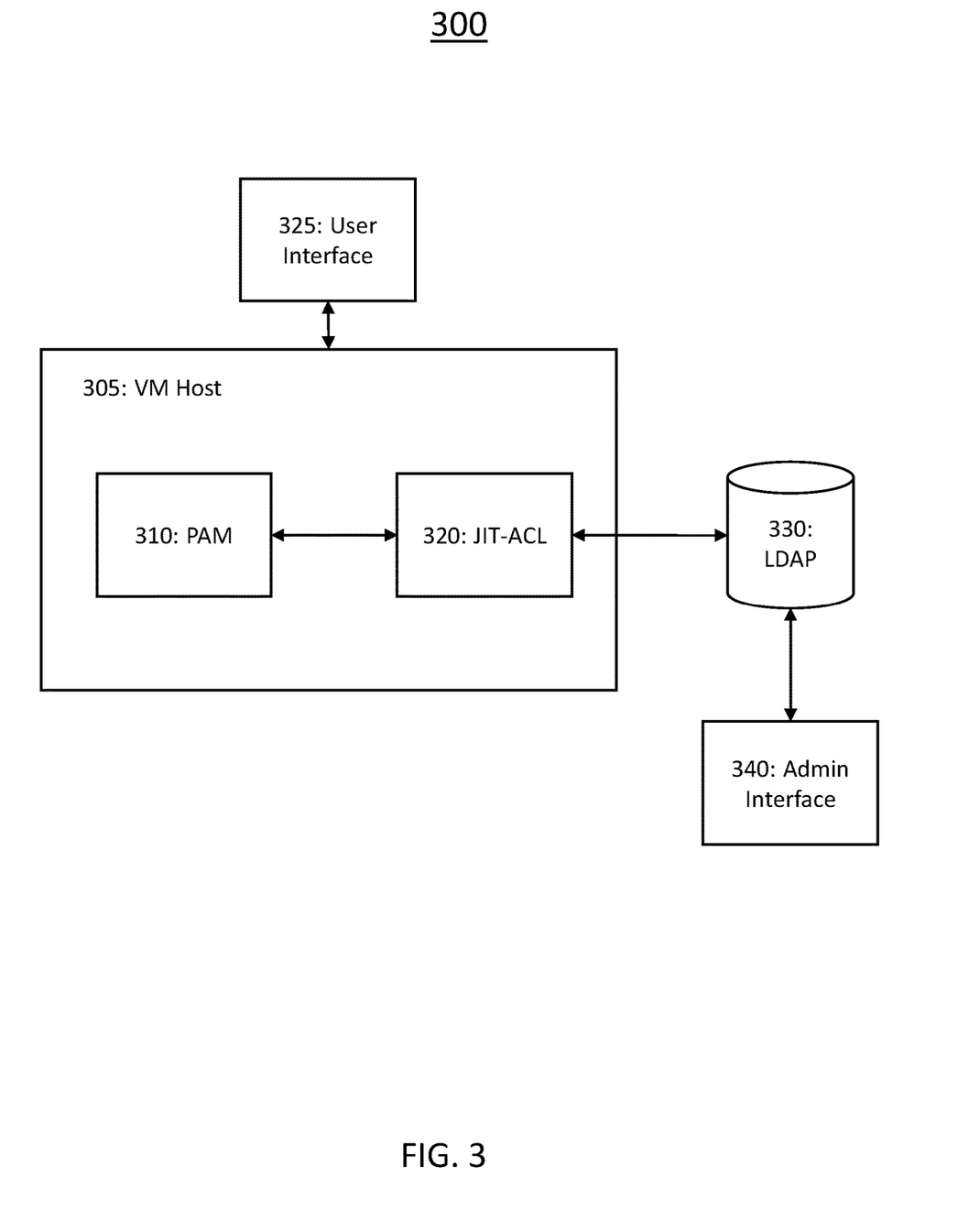
FIG. 3 is a block diagram of an exemplary system for just in time access control according to an exemplary embodiment of the present disclosure.

Turning now to FIG. 3, an exemplary relationship diagram 300 for just in time access control according to an exemplary embodiment of the present disclosure is shown. The exemplary relationship diagram 300 shows a user interface 325, a host 305, a PAM API 310, a JIT-ACL 320, an LDAP directory 330 and an administrator interface 340.

In some exemplary embodiments, a user interface 325 is used by a user to provide user credentials to the host application 305. When a PAM enabled application is invoked, the application will delegate authentication and authorization to PAM API which will execute the configured PAM modules in the sequence that is configured for that application. Those PAM modules can perform the task of authentication, making sure the user is who they claim to be, or authorization, making sure the user is allowed access which is handled by the JIT-ACL 320. The PAM API 310 uses a plurality of functions to perform authentication of the user credentials and authorization of the user which may include a user name and password, biometric data such as fingerprints, and the like. These PAM functions are pluggable such that different functions run different tests and modular such that new functions can be added with new PAM libraries. These PAM libraries are used for user authorization so that these authorization checks do not need to be rewritten for each application and updated as security threats evolve. The PAM configuration files are typically deployed with other utility files that handle individual authentication tasks.

The PAM API 310 can use the JIT-ACL 320 to for authorization of the privileged access user. Authorization can be requested to determine which hosts the privileged access user has access to and during which times. The PAM API 310 will generate a request for authorization and couple this request to the JIT-ACL 320 indicative of the privileged access user. The JIT-ACL 320 will then request the current rule set from the LDAP directory 330. The LDAP directory 330 then couples the current rule set to the JIT-ACL 320. The JIT-ACL 320 then determines if a matching rule is found. If a matching rule is found, the JIT-ACL 320 returns a PAM_SUCCESS indicator to the PAM API 310. If no matching rule is found, the JIT-ACL 320 will return a PAM_AUTH_ERR to the PAM API 310.

Using a user ID, the JIT-ACL 320 can query the LDAP directory 330 to retrieve the corresponding rule set. The JIT-ACL 320 can then determine if the host and invocation time data satisfy the authentication rule set for the user. The JIT-ACL 320 can then determine if there is a PAM success or a PAM auth error and couple the results of this determination to the PAM 310.

The administrator interface 340 can be configured for updating the data within the LDAP directory 330. The administrator can add or delete users, add, delete or replace attributes and update values of attributes. The administrator can update the data within the LDAP directory 330 without accessing the host 305. In addition, the LDAP directory may be dynamically managed by an external system in response to a request form a user requesting authorization. The user may request a rule to be added, modified or deleted. For example, the user may request access for a time duration on a particular host. This request may be transmitted to a peer or supervisor who can determine a validity of the request. If the request is authorized, the LDAP directory is automatically updated with the defined rule and/or rule change Turning now to FIG. 4, a flowchart 400 of a method for just in time access control according to an exemplary embodiment of the present disclosure is shown. The exemplary method may be performed by a processor with in a host server coupled to a computer network for receiving data from a plurality of devices. The devices can include client devices for transmitting data and user inputs or may include data servers hosting data directories for providing user account information and user access controls established by a system administrator. The method is first operative for receiving 410 user information from a user interface indicative of a user at a host server. The user information can be received from a user interface on a remote client computer or other device coupled to the host server via a computer network, such as the internet. The user information can include a user name, password, and other identification information.

Figure 4:
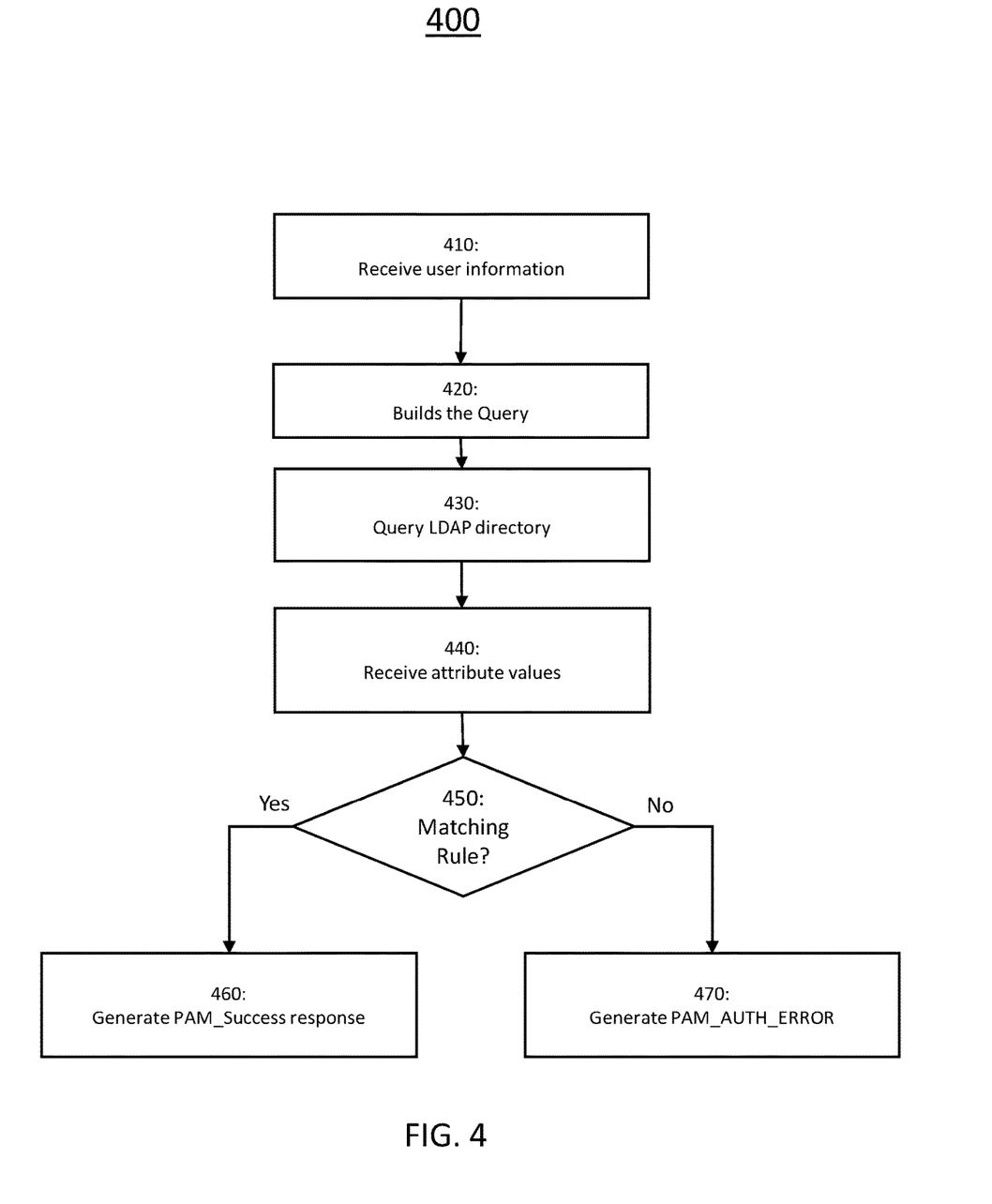
FIG. 4 is a flowchart of a method for just in time access control according to an exemplary embodiment of the present disclosure.

The method is operative to receive 420 an access request indicative of the user identification, a time of invocation of the access request and the host server FQDN (fully qualified domain name). The access request can be generated by a PAM function and coupled to the JIT ACL. The access request can include user information, requested FQDN of the host, application or service, and may include a timestamp of the invocation of the access request. In some exemplary embodiments, the method may perform the authorization.

The method next is configured for querying 430 a LDAP directory in response to the user information and the request. The JIT ACL can perform the query via a communications network, such as the internet. The JIT ACL performs the query directly with the LDAP directory at the time of receiving the access request. This reduces the latency between the request and the fresh results and overcomes the problem with stale cached results.

Next, a plurality of attribute values and/or rules associated with the user credential are received from the LDAP directory including a time bound access limit and a host access restriction information, if any. Since the query only involves the information of one user, the load on the network is greatly reduced as compared to refreshing a local LDAP directory cache.

The JIT ACL then determines 450 if a matching rule is found. The JIT ACL attempts to match each rule if the user associated with the user information, the host, and the access time in order to determine success condition for privileged use. If matching rules are determined, the JIT ACL returns 460 a PAM_SUCCESS indicator to the PAM API. In response to the PAM_SUCESS indicator, the PAM API and/or the host server can allow access as is indicated by the host access restriction for the host service and the time of invocation being within the time bound access limit.

If a matching rule is not found, the JIT ACL will return 470 a PAM_AUTH_ERR to the PAM API. The JIT ACL can be configured for coupling the authorization error response to the PAM API. In some exemplary embodiments, a rule that is not matching does not necessarily mean user access is denied. If at least one rule matches the user is authorized for JIT access. If none of the rules match, that does mean the user does not current gain JIT access until authorization is established.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

The various tasks performed in connection with the process may be performed by software, hardware, firmware, or any combination thereof. For illustrative purposes, the following description of process may refer to elements mentioned above. In practice, portions of process may be performed by different elements of the described system, e.g., component A, component B, or component C. It should be appreciated that process may include any number of additional or alternative tasks, the tasks shown need not be performed in the illustrated order, and process may be incorporated into a more comprehensive procedure or process having additional functionality not described in detail herein. Moreover, one or more of the tasks shown could be omitted from an embodiment of the process as long as the intended overall functionality remains intact.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A non-transitory computer readable medium having computer instructions stored therein that when executed by a computer system cause the computer system to perform operations comprising:
   receiving a user information from a user interface indicative of a user at a host server;
   receiving an access request via a pluggable access module indicative of the user information, a time of invocation of the access request and the host server;
   querying a lightweight directory access protocol directory in response to the user information and the request;
   receiving a plurality of attribute values associated with the user information including a time bound access limit and a host access restriction information; and
   coupling an access success response to the pluggable access module in response to a host server access allowance indicated by the host access restriction information for the host service and the time of invocation being within the time bound access limit.

2. The non-transitory computer readable medium of claim 1, wherein the lightweight directory access protocol directory is a remote directory.

3. The non-transitory computer readable medium of claim 1, wherein the time bound access limit is indicative of an access start time and an access end time.

4. The non-transitory computer readable medium of claim 1, wherein the host access restriction information is indicative of at least one host server that can be accessed in response to the user information.

5. The non-transitory computer readable medium of claim 1, wherein the user information is indicative of a privileged access user.

6. The non-transitory computer readable medium of claim 1, wherein the host server is configured to provide the user access to an application in response to the access success response.

7. The non-transitory computer readable medium of claim 1, wherein the host server is configured to provide the user access to an application in response to the access success response.

8. The non-transitory computer readable medium of claim 1, wherein the lightweight directory access protocol directory is configured by an administrator separate from the host server.

9. The non-transitory computer readable medium of claim 1, further including enforcing an access control layer for secure shell access on the host server in response to the access success response.

10. A computer system comprising:

a memory storing computer-executable instructions; and a processor that accesses the memory and executes the computer-executable instructions for at least:

receiving a user information from a user interface indicative of a user at a host server;

receiving an access request via a pluggable access module indicative of the user information, a time of invocation of the access request and the host server;

querying a lightweight directory access protocol directory in response to the user information and the request;

receiving a plurality of attribute values associated with the user information including a time bound access limit and a host access restriction information; and coupling an access success response to the pluggable access module in response to a host server access allowance indicated by the host access restriction information for the host service and the time of invocation being within the time bound access limit.

11. The computer system of claim 10 wherein the lightweight directory access protocol directory is coupled to the computer system via a network adapter.

12. The computer system of claim 10 wherein the time bound access limit is indicative of a maximum time duration.

13. The computer system of claim 10 wherein the host access restriction information is indicative of the computer system.

14. The computer system of claim 10 wherein the access request is generated in response to the user information being indicative of a privileged access user.

15. The computer system of claim 10 wherein the processor is further operative to provide a user access to an application in response to the access success response.

16. The computer system of claim 10 wherein the processor is configured to provide the user access to an application on the host server in response to the access success response.

17. The computer system of claim 10 wherein the lightweight directory access protocol directory is configured by an administrator separate from the computer system.

18. The computer system of claim 10 wherein the processor is further configured for enforcing an access control layer for secure shell access on the host server in response to the access success response.

19. A system for controlling access to protected computer resources provided via a network utilizing at least one Internet Protocol, the system comprising:

a processor and a memory including processes to be executed by the processor to implement:

a host server configured to receive a user information from a client computing device indicative of a user account and to generate an access request via a pluggable access module indicative of the user information, a time of invocation of the access request and the host server; and an authorization server configured for querying a lightweight directory access protocol directory in response to the user information and the request, receiving a plurality of attribute values associated with the user information including a time bound access limit and a host access restriction information, and coupling an access success response to the host server in response to a host server access allowance indicated by the host access restriction information for the host service and the time of invocation being within the time bound access limit.

20. The system of claim 19 wherein the host server is a first software application and the authorization server is a second software application.

* * * * *